(12) United States Patent
Kaneko et al.

(10) Patent No.: US 12,096,756 B2
(45) Date of Patent: Sep. 24, 2024

(54) REEL SEAT

(71) Applicant: GLOBERIDE, Inc., Tokyo (JP)

(72) Inventors: Kyoichi Kaneko, Tokyo (JP); Yoshinao Kato, Tokyo (JP); Masaru Akiba, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 0 days.

(21) Appl. No.: 18/023,611

(22) PCT Filed: Aug. 26, 2021

(86) PCT No.: PCT/JP2021/031316
§ 371 (c)(1),
(2) Date: Feb. 27, 2023

(87) PCT Pub. No.: WO2022/070697
PCT Pub. Date: Apr. 7, 2022

(65) Prior Publication Data
US 2024/0023530 A1 Jan. 25, 2024

(30) Foreign Application Priority Data

Sep. 29, 2020 (JP) ................................ 2020-162831

(51) Int. Cl.
*A01K 89/015* (2006.01)
*A01K 87/06* (2006.01)

(52) U.S. Cl.
CPC ........ *A01K 89/01925* (2015.05); *A01K 87/06* (2013.01)

(58) Field of Classification Search
CPC ... A01K 89/01925; A01K 87/06; A01K 87/08
See application file for complete search history.

(56) References Cited

U.S. PATENT DOCUMENTS

| 4,334,378 A | * | 6/1982 | Worth | A01K 87/08 43/22 |
| 5,004,181 A | * | 4/1991 | Fowles | A01K 89/012 43/26.1 |
| 5,127,182 A | * | 7/1992 | Hutchings | A01K 87/08 43/25 |

FOREIGN PATENT DOCUMENTS

| FR | 882204 A | 5/1943 |
| JP | H02174624 A | 7/1990 |

(Continued)

OTHER PUBLICATIONS

International Search Report for related International Application No. PCT/JP2021/031316; action dated Apr. 7, 2022; (5 pages).

(Continued)

*Primary Examiner* — Richard G Davis
(74) *Attorney, Agent, or Firm* — Oliff PLC

(57) ABSTRACT

A reel seat comprises a seat main body that comprises a reel leg placing portion to which a reel leg is placed and fixed and a tubular portion provided with an opening hole into which a rear end portion of a rod is fitted and fixed, and a grip is disposed on a rear side of the reel leg placing portion. The opening hole is formed so the rod to be fitted and fixed is offset downward relative to an axial center X of the grip, is formed further on a lower side than the reel leg placing portion, and is formed so that a rear end edge of the rod is located further on a rear side than a front end of a reel leg in a state where the reel leg of a fishing reel is placed and fixed to the reel leg placing portion.

9 Claims, 7 Drawing Sheets

(56) References Cited

FOREIGN PATENT DOCUMENTS

JP         H08001660     *    1/1996
JP         H08001660 Y2      1/1996

OTHER PUBLICATIONS

Written Opinion for related International Application No. PCT/JP2021/031316; action dated Apr. 7, 2022; (4 pages).
International Preliminary Report on Patentability for related International Application No. PCT/JP2021/031316; action dated Mar. 28, 2023; (9 pages).
Office Action for related Japanese Application No. 2020-162831; action dated Jun. 8, 2023; (7 pages).
Nov. 22, 2023 Office Action issued in British Patent Application No. GB2301997.9.
Examination Report in connection with UK Patent Application No. 2301997.9; action mailed on Sep. 8, 2023; (4 pages).
Feb. 12, 2024 Examination Report issued in Australian Patent Application No. 2021352641.
Jun. 1, 2024 Office Action issued in Chinese Application No. 202180052090.7.
Jul. 1, 2024 Office Action issued in Australian Application No. 2021352641.

* cited by examiner

REEL SEAT

CROSS-REFERENCE TO RELATED APPLICATIONS

The present application is a National Stage of International Application No. PCT/JP2021/031316 filed on Aug. 26, 2021 which claims priority to and the benefit of Japanese Patent Application No. 2020-162831 filed on Sep. 29, 2020, the contents of which are incorporated herein by reference in their entirety.

FIELD

The present disclosure relates to a reel seat attached to various fishing rods such as a lure rod and a ship rod and used for mounting and fixing a reel.

BACKGROUND

Conventionally, in a fishing rod using a reel, a reel seat for mounting the reel is fixed to a base rod, and a tubular reel seat fixed to an outer peripheral surface of the base rod has been known. As such a reel seat, for example, Patent Literature 1 discloses in FIG. 1 thereof a reel seat (also referred to as an offset reel seat) having a configuration in which an attachment position for a reel (reel leg placing portion) is offset downward with respect to the axial center of a grip on the rear side of the reel to be attached.

In the seat main body of the offset reel seat, an opening hole for inserting and fixing the rear end of the rod (blank) is formed on the front side, and the reel leg placing portion is formed on the rear side of the opening hole. Also, on the rear side of the reel leg placing portion, a rear projection protruding rearward is formed at a position shifted upward, and a grip member is attached to this part. That is, in a case where the reel is attached and fixed to the reel leg placing portion, the height position of the reel is lowered with respect to the grip attached to the rear projection, so that the thumbing operation and the switching operability of the clutch can be improved when the reel is held while gripping the grip on the rear side. In particular, even in a case where a double-bearing reel in which the side plates are formed in circular shapes is mounted, the operation position of the thumb is not raised when the grip portion on the rear side is gripped, so that it is possible to suppress a decrease in operability due to the palm opening at the time of casting.

CITATION LIST

Patent Literature

Patent Literature 1: JP H2-174624 A

SUMMARY

In the above-described conventional offset reel seat, since the fixing position of the rod is located further on the front side than the reel leg placing portion, the rod and the seat main body are easy to be damaged when stress concentration occurs. That is, in actual fishing, when a load is applied to the fishing rod in a state where the reel is mounted, stress concentrates at the front of the reel leg in a state where the reel is held and gripped, whereby the rod and the reel seat are easy to be damaged, and the operability is degraded. In this case, the strength can be improved by reinforcing the region from the lower region of the reel leg placing portion to the opening hole for fixing the rod, for example, by thickening the region, but the weight will be increased by the reinforcement, the compactness cannot be achieved, and the operability will be degraded.

The present disclosure has been made in view of the above problems, and an object of the present disclosure is to provide a reel seat that is lightweight, stable in strength, and excellent in fishing operability.

To achieve the aforementioned object, a reel seat according to the present disclosure comprises a seat main body that comprises a reel leg placing portion to which a reel leg of a fishing reel is placed and fixed and a tubular portion provided with an opening hole into which a rear end portion of a rod is fitted and fixed. A grip is disposed on a rear side of the reel leg placing portion. The opening hole is formed so that the rod to be fitted and fixed or the rod to be fitted and fixed with a joining material interposed therebetween is offset downward with respect to an axial center of the grip, is formed further on a lower side than the reel leg placing portion, and is formed so that a rear end edge of the rod or a rear end edge of the joining material is located further on a rear side than a front end edge of the reel leg in a state where the reel leg of the fishing reel is placed and fixed to the reel leg placing portion.

In the seat main body of the reel seat, the opening hole into which the rear end of the rod is fitted and fixed is formed to be offset downward with respect to the axial center of the grip, and the opening hole is formed so that the rear end edge of the rod is located further on the rear side than the front end edge of the reel leg in a state where the reel leg of the fishing reel is placed and fixed to the reel leg placing portion. Therefore, it is possible to suppress concentration of stress on the front of the reel leg when the fishing rod is bent in the state of holding and gripping the reel. As a result, the rod and the reel seat are difficult to be damaged, and the operability can be improved. Also, since the region from the lower region of the reel leg placing portion to the opening hole for fixing the rod can be made compact, the weight can be reduced, and the operability at the time of fishing can be improved. Note that the rear end of the rod may be fixed to the opening hole directly by adhesion or the like, or with a joining material (spacer) interposed therebetween. In a case where the joining material (spacer) is interposed between the inner peripheral surface of the opening hole and the outer peripheral surface of the base end of the rod, the rear end edge of the joining material is only required to be located further on the rear side than the front end edge of the reel leg, and in a case where the joining material has sufficient strength, the rear end edge of the rod may be located further on the front side than the front end edge of the reel leg.

With the reel seat according to the present disclosure, it is possible to obtain a reel seat that is lightweight, stable in strength, and excellent in fishing operability.

BRIEF DESCRIPTION OF THE DRAWINGS

FIG. 4 is a diagram illustrating the reel seat illustrated in FIG. 1, in which

DETAILED DESCRIPTION

Hereinafter, an embodiment of a reel seat according to the present disclosure will be specifically described with reference to the accompanying drawings.

Figure 1:
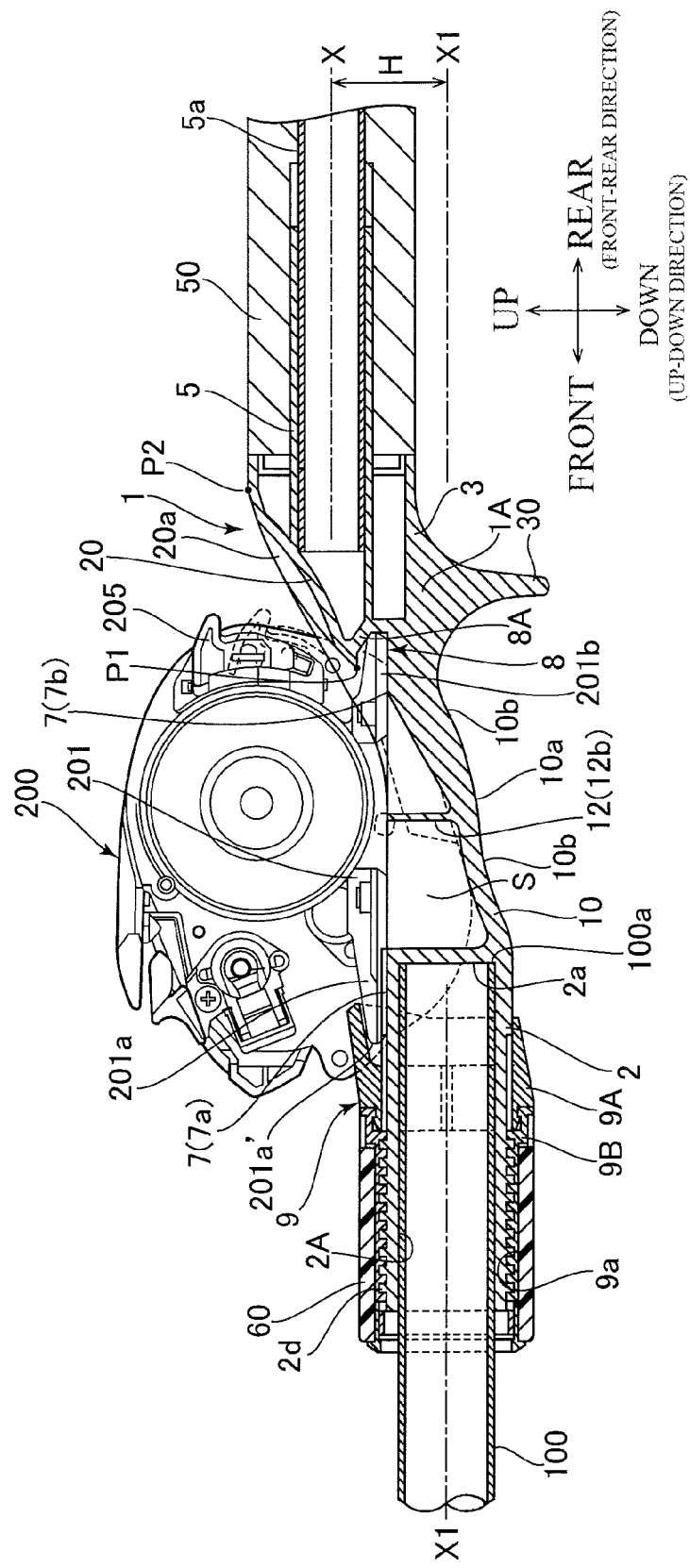
FIG. 1 is a diagram illustrating a state in which a fishing reel is attached to and fixed to a reel seat according to the present disclosure, and is an axial cross-sectional view of the reel seat portion.
Figure 2:
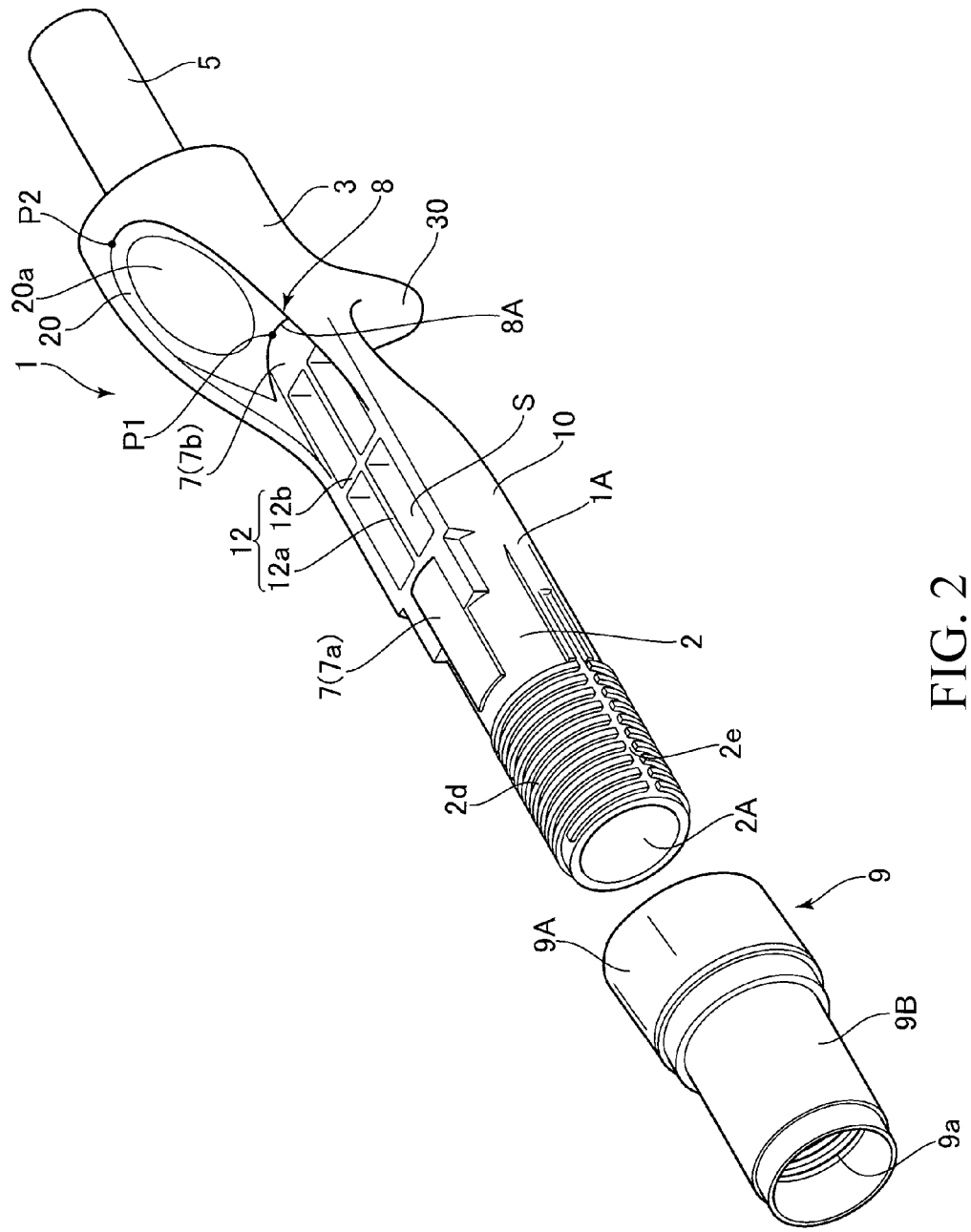
FIG. 2 is an exploded perspective view of the reel seat illustrated in FIG. 1 as viewed diagonally from the upper front.
Figure 3:
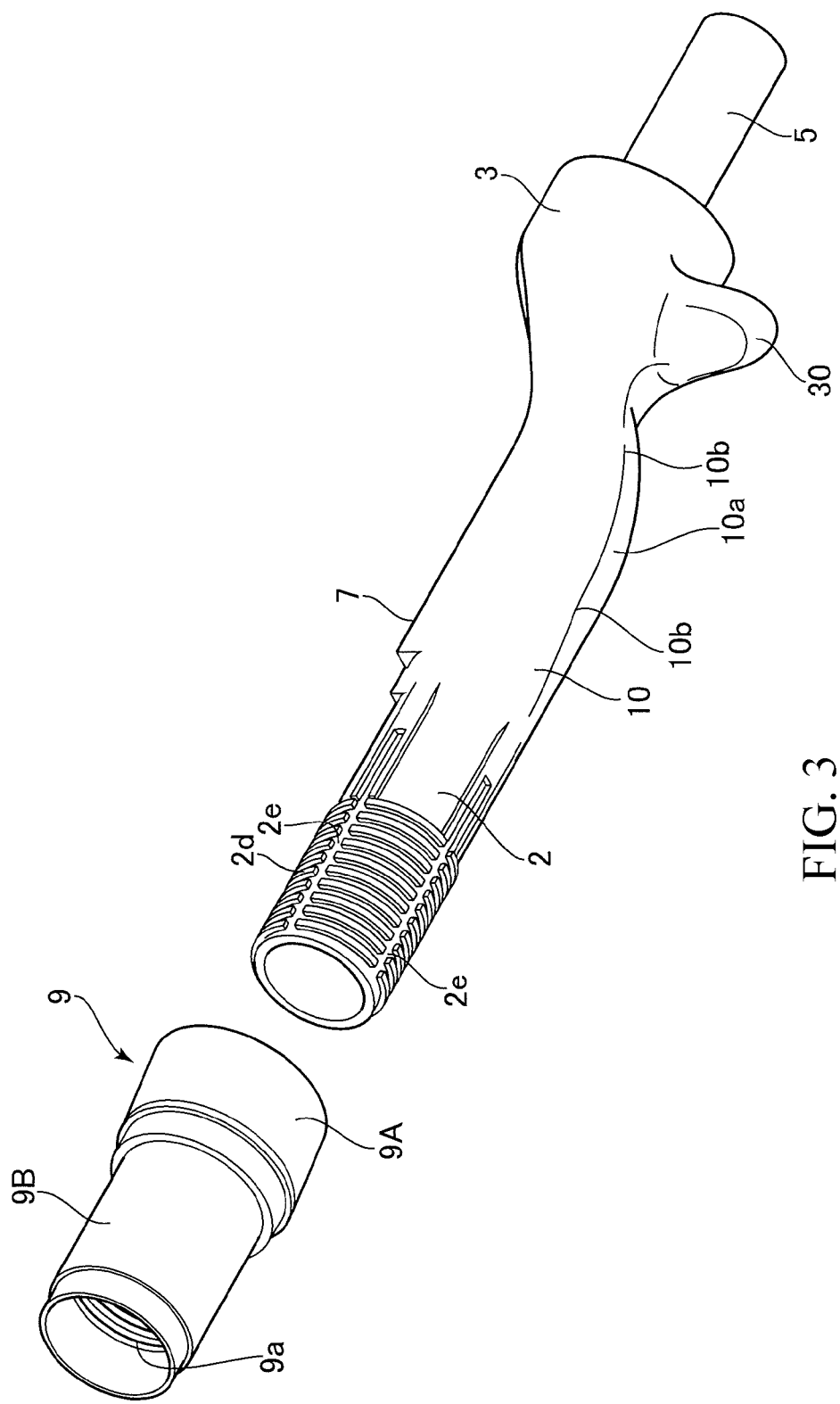
FIG. 3 is an exploded perspective view of the reel seat illustrated in FIG. 1 as viewed diagonally from the lower front.
Figure 4A:
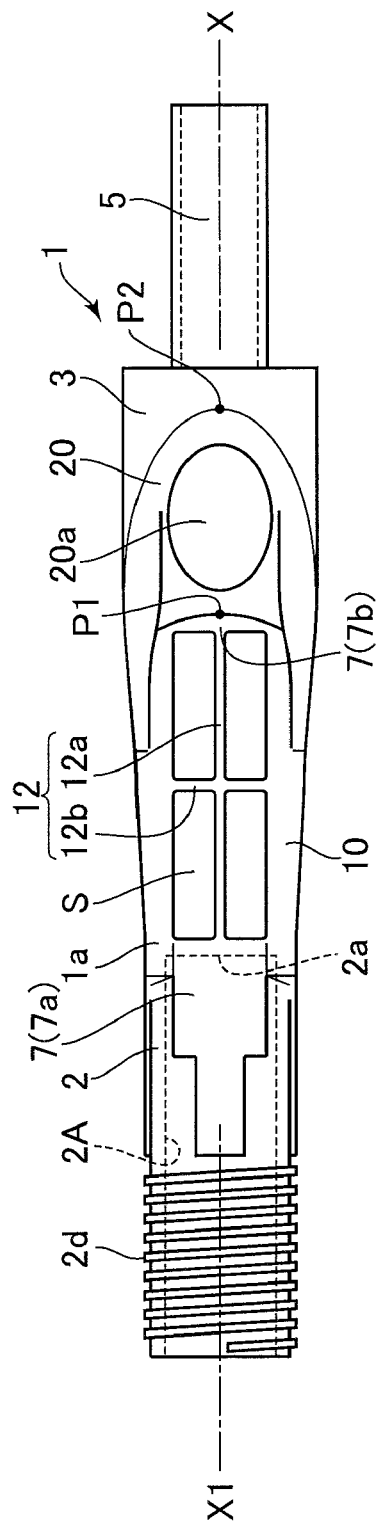
FIG. 4(a) is a plan view.
Figure 4B:
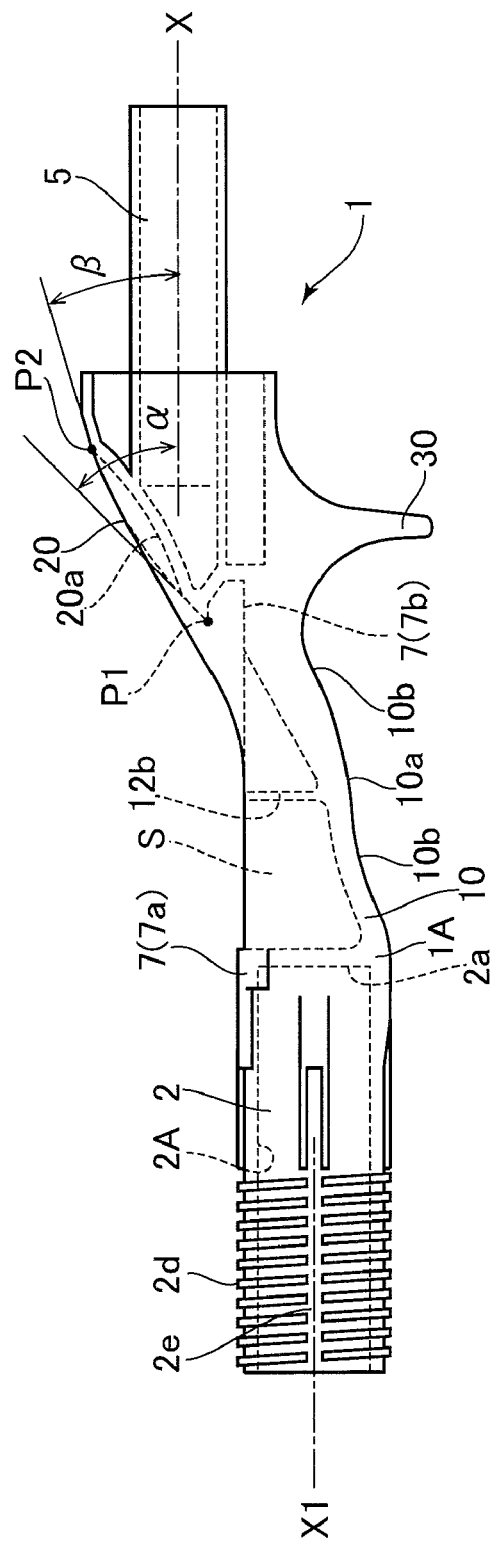
FIG. 4(b) is a side view.
Figure 4C:
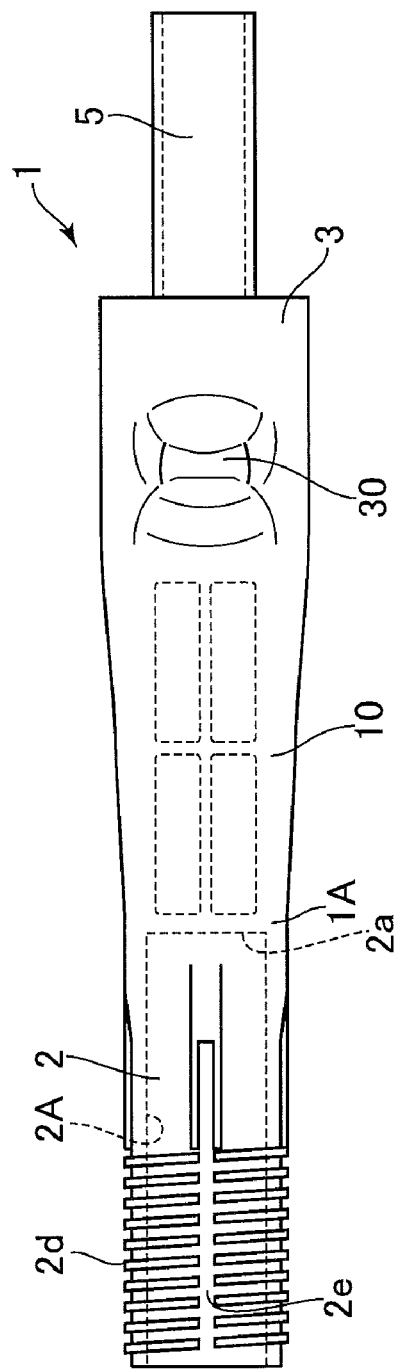
FIG. 4(c) is a back view.

FIGS. 1 to 4 are diagrams illustrating an embodiment of a reel seat according to the present disclosure, in which FIG. 1 is an axial cross-sectional view illustrating a state in which a fishing reel is mounted and fixed to the reel seat, FIG. 2 is an exploded perspective view of the reel seat as viewed diagonally from the upper front, FIG. 3 is an exploded perspective view of the reel seat as viewed diagonally from the lower front, FIG. 4(a) is a plan view, FIG. 4(b) is a side view, and FIG. 4(c) is a back view.

In the following description, a front-rear direction (axial direction) and an up-down direction mean directions illustrated in FIG. 1, and a right-left direction (side direction) means a direction orthogonal to the sheet surface of FIG. 1. That is, a front side means a tip end side of a fishing rod, a rear side means a base end side, an upper side means a reel side with respect to an axial center X1 of the base rod (rod) when a double-bearing reel is mounted on a reel leg placing portion, and a lower side means an opposite side of the reel side. Also, the present disclosure is directed to a configuration in which the position of the reel leg placing portion is offset downward with respect to a grip (grip axial center X) on the rear side of the reel to be mounted, as described above. Therefore, when the double-bearing reel is attached to the reel leg placing portion of such a reel seat, the position of the reel leg is shifted downward with respect to the grip on the rear side, and when the grip is gripped, the thumb can be brought into contact with the reel main body without largely opening the palm.

A seat main body 1A of a reel seat 1 according to the present disclosure comprises a substantially cylindrical tubular portion (front tubular portion) 2 on the front side and a substantially cylindrical tubular portion (rear tubular portion) 3 on the rear side. In the rear tubular portion 3, a rear protruding portion 5 formed substantially in a cylindrical shape is formed to protrude toward the rear side in the axial direction at an intermediate position of an inclined surface 20 described later so that a grip member (rear grip) 50 constituting a grip is attached.

Figure 5:
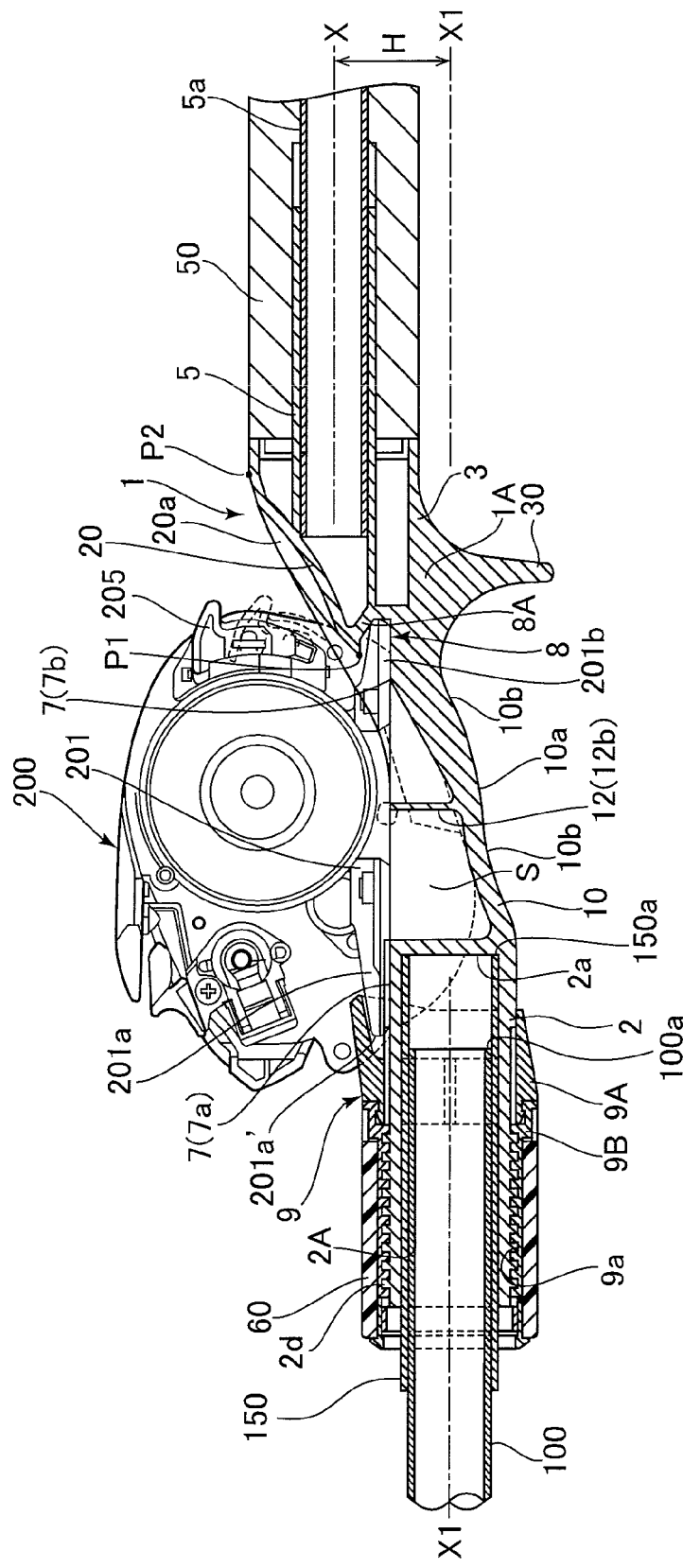
FIG. 5 is an axial cross-sectional view illustrating a modification example of the reel sheet portion.

In the front tubular portion 2, an opening hole 2A having a bottom 2a is formed, the base end side of a rod (base rod) 100 constituting a fishing rod is inserted into the opening hole 2A, and the outer peripheral surface thereof is fixed by adhesion or the like. In this case, the base end side of the rod 100 may be directly fixed to the inner peripheral surface of the opening hole 2A, or as illustrated in FIG. 5, a joining material (tubular spacer) 150 may be interposed and fixed between the base end side outer peripheral surface of the rod 100 and the inner peripheral surface of the opening hole 2A. Also, as described later, as long as a rear end edge 100a of the rod 100 is located further on the rear side than a front end edge 201a' of the reel leg, the rear end edge 100a may be fixed in a state of being in contact with the bottom 2a of the opening hole 2A, or may be fixed in a state of being slightly separated from the bottom 2a. Alternatively, in the configuration in which the spacer 150 is interposed as illustrated in FIG. 5, a rear end edge 150a of the spacer 150 may be brought into contact with the bottom 2a without bringing the rear end edge 100a of the rod 100 into contact with the bottom 2a, or the rear end edge 150a of the spacer may be fixed to be slightly separated from the bottom 2a. Meanwhile, in the configuration in which the spacer 150 is interposed, the rear end edge 150a of the spacer 150 is only required to be located further on the rear side than the front end edge 201a' of the reel leg, and in a case where the spacer 150 has sufficient strength, the rear end edge 100a of the rod 100 fixed inside the spacer 150 may be located further on the front side than the front end edge 201a' of the reel leg (refer to FIG. 5).

Also, the grip member 50 is fixed to the outer peripheral surface of the rear protruding portion 5 formed on the rear tubular portion 3 so as to protrude along the direction of the grip axial center X, and is configured to be flush with the surface of the rear tubular portion 3. In this case, the rear tubular portion 3, as well as the grip member 50, is a portion gripped and held, and serves as a grip.

In the present embodiment, a cylindrical member 5a is press-fitted and fixed to the inner surface of the rear protruding portion 5, the cylindrical member 5a is protruded rearward from the rear protruding portion 5 so as to be long, and the grip member 50 is fixed to the outer peripheral surface of the rear protruding portion 5 and the outer peripheral surface of the cylindrical member 5a. That is, the seat main body 1A is formed to be compact in the axial direction, and the grip member 50 formed to be long in the axial direction can be fixed.

Also, the configuration of the fishing rod comprising the rod 100 fixed in the opening hole 2A is not limited and may be a telescopic type, a jointed type, a single body type, or the like, and in FIG. 1, a part of the fishing rod (the rear end side of the base rod 100) is illustrated, and the entire configuration is omitted.

The reel seat main body 1A comprises a reel leg placing portion 7 on which a reel leg 201 of a fishing reel 200 is placed, and a fixed hood 8 comprising a fixed hood portion 8A that is disposed on the rear side of the reel leg placing portion 7 in the axial direction and that receives a rear end 201b of the reel leg 201. Also, a moving hood 9 is disposed on the front side of the seat main body 1A (on the front side of the reel leg placing portion 7 in the axial direction). The moving hood 9 comprises a moving hood portion 9A that is provided on the outer surface side of the tubular portion 2, that moves in the axial direction, and that receives a front end 201a of the reel leg 201, and a cylindrical portion 9B that engages with the moving hood portion 9A so as to be independently rotatable.

The inner peripheral surface of the cylindrical portion 9B is provided with a female screw portion 9a screwed to a male screw portion 2d formed on the outer peripheral surface of the tubular portion 2, and when the cylindrical portion 9B is rotated by the screwing relationship of the screws, the moving hood portion 9A moves in the axial direction without rotating due to the engagement relationship between the moving hood portion 9A and the cylindrical portion 9B. This engagement relationship can be established, for example, by forming a ring-shaped annular protrusion at the rear end of the moving hood portion 9A, forming a ring-shaped annular recess at the front end of the cylindrical portion 9B, and fitting the recess to the protrusion, whereby the cylindrical portion 9B can independently be rotated with respect to the moving hood portion 9A. In this case, by forming a guide groove (or a protrusion) 2e along the axial direction on the outer peripheral surface of the front tubular portion 2, and forming a protrusion (not illustrated; or a groove) that is fitted to the guide groove 2e along the axial direction on the inner peripheral surface of the moving hood 9A, the moving hood 9A can stably be moved in the axial direction when the cylindrical portion 9B rotates. Note that it is preferable to provide a plurality of such engagement portions between the protrusions and the grooves at predetermined intervals in the circumferential direction.

Also, the cylindrical portion 9B is formed to have a smaller diameter than the front end of the moving hood portion 9A, and a grip member (front grip) 60 is attached to the outer peripheral surface of the cylindrical portion 9B. The cylindrical portion 9B and the front grip 60 are formed to have diameter dimensions so as to be substantially flush with the front end of the moving hood portion 9A, and the grip member 60 has a function as a rotation operating member that moves the moving hood portion 9A forward and backward in the axial direction.

Therefore, in a state where the reel leg 201 is placed on the reel leg placing portion 7, and where the rear end 201b thereof is fitted into the hood portion 8A of the fixed hood 8, the front end 201a is tightened by the moving hood portion 9A of the moving hood 9 that moves in the axial direction by means of the rotation operation of the cylindrical portion 9B (front grip 60), whereby the fishing reel 200 can be mounted and fixed to the reel seat 1 (reel leg placing portion 7).

As described above, the seat main body TA is formed so that the axial center X1 of the rod 100 fitted and fixed in the opening hole 2A is offset downward (the offset amount is expressed as H) with respect to the grip axial center X. Therefore, when the grip member 50 is gripped and held, the position of the reel 200 attached and fixed to the reel leg placing portion 7 is lowered to correspond to the offset amount, so that the thumbing operation on the spool and the ON/OFF operation of a clutch lever 205 are easily performed.

In this case, as illustrated in FIGS. 1 and 4(b), the seat main body 1A according to the present embodiment is formed so that the grip axial center X and the axial center X1 of the rod are parallel to each other, but may be formed so that either or both the grip axial center X or/and the axial center X1 of the rod is/are inclined to cross each other. That is, the directions of both the axial centers X and X1 can appropriately be changed in consideration of the offset amount, operability, or the like. However, both the axial centers X and X1 are preferably located coaxially in a planar view so as not to degrade the operability (FIG. 4(a)).

The front end side of the reel leg placing portion 7 is integrated with the upper surface of the front tubular portion 2, and thus the opening hole 2A is formed further on the lower side than the reel leg placing portion 7. Also, the opening hole 2A is formed so that the rod rear end (the rear end edge 100a of the rod 100) is located further on the rear side than the front end 201a of the reel leg 201, specifically, the front end edge 201a', in a state where the reel leg 201 of the fishing reel 200 is placed and fixed to the reel leg placing portion 7. That is, the axial depth (the position of the bottom 2a) of the opening hole 2A is formed so as to be located further on the rear side than the front end edge 201a' of the reel leg fixed to the reel leg placing portion 7.

The seat main body TA comprises an intermediate connecting portion (also referred to as a bridge portion) 10 that connects the front tubular portion 2 and the rear tubular portion 3 in the axial direction, and these portions are integrally formed. The bridge portion 10 is formed so that the upper side is opened and the cross section in a direction orthogonal to the axial direction is formed substantially in a semi-cylindrical shape. Also, the surface (lower surface) of the bridge portion 10 according to the present embodiment is formed so as to gradually rise from the position of the bottom 2a of the opening hole 2A to the rear side in accordance with the offset amount, and the inside of the bridge portion 10 comprises a cavity portion S. By forming the cavity portion S in this manner, the reel leg placing portion 7 is divided into a placing surface (front placing portion) 7a that supports the back surface of the reel leg 201 on the front end side and a placing surface (rear placing portion) 7b that supports the rear end side, and the intermediate portion thereof is discontinuous. That is, when the reel leg is placed and fixed to the placing surfaces 7a and 7b, the cavity portion S of the bridge portion is located on the lower side of the reel leg.

In this manner, since the position where the base end region of the rod 100 is fixed is set to the lower side of the reel leg placing portion 7 (placing surface 7a), and the position of the rear end edge 100a is set to a position further on the rear side than the front end edge 201a' of the reel leg 201, it is possible to suppress concentration of stress on the front of the reel leg (the front end 201a of the reel leg 201) when the fishing rod is bent in the state of holding and gripping the reel. Therefore, the strength of the seat main body can be maintained, and the fishing operability can be improved. Also, since the strength of the seat main body is maintained, an increase in weight due to reinforcement can be suppressed, and a hollowing structure such as forming the cavity portion S in the bridge portion 10 can be formed. Furthermore, the weight of the seat main body 1A can be reduced, and the seat main body 1A can be made compact in the axial direction.

Note that the bridge portion 10 may be formed in a solid shape. In the case of forming the cavity portion S as described above, it is preferable to form a rib (reinforcement rib) 12 on the inner surface of the portion. The arrangement state of the reinforcement rib 12 is not particularly limited, but it is preferable to have a configuration of including a longitudinal rib 12a along the axial direction and a lateral rib (including a lateral rib in the direction inclined with respect to the axial direction) 12b crossing the axial direction. With this configuration, it is possible to improve the strength against crushing when the lower surface of the bridge portion 10 is gripped and held, and it is possible to reduce the thickness of the bridge portion 10 to reduce the weight. Also, in a case where such a reinforcement rib is formed, at least a part of the reel leg 201 of the fishing reel placed to the front placing surface 7a and the rear placing surface 7b preferably abuts on the reinforcement rib. Accordingly, the reel leg 201 can be supported in a stable manner.

As described above, the lower surface of the bridge portion 10 is formed so as to gradually rise from the position of the bottom 2a of the opening hole 2A to the rear side. In this case, since the lower surface is a portion on which the pads of the index finger, the middle finger, and the ring finger abut (or which is gripped) when the reel as well as the grip portion 50 is gripped and held, the lower surface is preferably formed in a curved shape having protrusions and recesses (a protrusion 10a and a recess 10b) along the axial direction so that the fingers can come in good contact and be hardly slid in the axial direction.

The inner surface of the bridge portion 10 on the rear end side rises toward the rear side, and the reel leg placing portion 7 (placing surface 7b) and the fixed hood 8 are formed in the middle thereof. Also, the rear side of the fixed hood 8 is connected to the rear tubular portion 3, and on the rear side of the fishing reel 200 attached to and fixed to the reel leg placing portion 7 (placing surface 7b), an inclined surface 20 that connects an upper end position P1 of the hood portion 8A of the fixed hood 8 to the surface of the grip portion 50 is formed. The inclined surface 20 is formed on the seat main body 1A by offsetting the opening portion 2A of the seat main body 1A with respect to the axial center X of the grip, and is integrally formed with the rear tubular portion 3.

In the present disclosure, the offset amount H and the inclination angle of the inclined surface described above are not limited, but in a case where the offset amount is large, the position of the clutch lever 205 disposed between the side plates is lowered when a double-bearing reel having a low profile is attached, and a sufficient gap is not secured with respect to the inclined surface 20, and the clutch OFF/clutch ON operation becomes difficult to perform. In addition, in a case where the inclination angle becomes steep, a sufficient gap is not secured with respect to the reel. For this reason, the inclined surface 20 is preferably formed such that an inclination angle $\alpha$ of the line rising from the upper end position P1 of the hood portion 8A toward the grip upper surface (inclination angle of upward inclination with respect to the axial center X) does not exceed 45° as viewed from the side. By doing so, even in a case where a small reel is attached, the clutch lever 205 disposed between the side plates can be operated without any problem. That is, by setting the inclination angle of the inclined surface 20 rising from the upper end position P1 of the hood portion 8A to 45° or less, a sufficient gap can be secured between the clutch lever 205 and the inclined surface 20, particularly, a gap to the extent that the finger can be easily pressed against the lower surface of the clutch lever can be secured when the clutch is turned from OFF to ON.

In this case, the inclined surface 20 may be formed so that the inclination angle $\alpha$ exceeds 45°, but in such a configuration, the inclined surface becomes steep, and the clutch operation becomes difficult particularly when the offset amount H is increased. In addition, the inclination angle 45° is an intermediate angle between the horizontal state and the vertical state, and it is easy to capture the sense at the time of gripping, and when the inclination angle rises to this angle or more, this angle is more likely to be sensed as steep and a sense of discomfort tends to occur. However, by setting the inclination angle to 45° or less, such a sense of discomfort can be reduced.

Also, the inclined surface 20 is preferably curved such that an inclination angle R on the upper end side (the portion close to the surface of the grip portion 50) is smaller than the inclination angle $\alpha$ of the line rising from the upper end position P1 of the hood portion 8A. As a result, the inclination on the upper end side becomes gentle while a gap on the lower end side of the inclined surface 20 is secured, and a gap into which the finger enters can sufficiently be secured with respect to the reel (clutch lever 205). That is, in a case where the inclination angle $\alpha$ of the inclined surface 20 rising toward the grip upper surface is uniform, the inclination angle at a position P2 where the angle starts to descend on the upper surface of the grip portion 50 is too large and thus gives a sense of discomfort when the thumb is inserted from the upper surface side of the grip portion 50 to the lower surface of the clutch lever 205, but by setting the inclination angle (descending angle) R on the upper end side to be smaller than the inclination angle $\alpha$ of the line rising from the upper end position P1, the thumb located on the upper surface of the grip portion 50 or the thumb located on the upper portion of the inclined surface can be moved along the inclined surface as it is to be easily inserted smoothly into the lower surface of the clutch lever 205.

As a result, a series of operations such as performing OFF operation of the clutch lever 205 while gripping the reel seat 1 of the fishing rod, performing ON operation of pushing up the clutch lever 205 with the thumb after the rig is landed on the water, and then performing winding operation can be smoothly repeated, and the thumb does not become hurt.

Note that the inclined surface 20 may be constituted by a linear composite surface so that the rising angle $\alpha$ and the descending angle R may differ when viewed from the side, but as illustrated in FIGS. 1 and 4(b), the inclined surface preferably comprises a curved surface which rises and ascends from the upper end position P1 of the hood portion 8A and whose inclination is gentler at a position closer to the grip upper surface side.

By forming the inclined surface 20 as a curved surface in this manner, the thumb does not become hurt even when used for a long time, and a series of operations from the casting operation to the winding operation can be smoothly performed. Note that, as long as the rising inclination angle $\alpha$ described above is 45° or less, and the descending inclination angle R is the inclination angle $\alpha$ or less, appropriate shape changes such as bulging the intermediate portion thereof can be performed.

In addition, the cross-sectional shape of the surface of the inclined surface 20 in the direction orthogonal to the axial direction may be flat or may be a curved surface. As illustrated in FIG. 2, the shape of the surface of the inclined surface 20 according to the present embodiment is formed to have a recessed portion 20a, in which the central region is recessed substantially in an elliptical shape. The recessed portion 20a is constituted by a surface in which the substantially entire surface of the inclined surface 20 is curved, and according to such a recessed portion 20a, the pad of the thumb placed on the inclined surface easily conforms to the inclined surface 20 (the surface of the recessed portion 20a), and the clutch operation can stably and easily be performed. In particular, by pushing down the clutch lever 205 when the clutch is switched from ON to OFF, shifting the thumb backward as it is, placing the thumb on the recessed portion 20a, and shifting the thumb forward as it is, the thumb can be smoothly guided to the lower surface of the clutch lever, and thus the switching operation from OFF to ON can easily be performed as well.

In addition, in the seat main body TA according to the present embodiment, a trigger 30 is formed on the side thereof opposite to the grip upper surface so as to protrude from a position (lower position of P1) corresponding to the upper end position P1 of the hood portion 8A while gradually curving downward. Since the protruding position of the trigger 30 is formed within the range in the axial direction of the inclined surface 20, when the finger is placed on the trigger 30, the operation of the thumb can be performed in a stable manner without opening the palm, and the above-described clutch operation can be performed in a stable manner. In this case, any one of the index finger, the middle finger, and the ring finger is placed on the trigger 30 depending on the grasping state. As described above, since the lower surface of the bridge portion 10 is formed in a curved shape comprising the protrusion and recess 10a and 10b along the axial direction, the finger comes in good contact and is hardly slid in the axial direction.

The seat main body TA is preferably integrally formed using a hard resin material, a fiber-reinforced resin material, or a lightweight metal material so as to achieve weight reduction. For example, by integrally forming a hard synthetic resin material such as nylon and ABS, a plastic composite material (FRP) with reinforcing fibers mixed such as glass fibers and carbon fibers, or a lightweight metal material such as aluminum and magnesium, by means of die casting, it is possible to effectively reduce weight while maintaining strength.

In addition, the grip members 50 and 60 can be formed by using a soft material such as natural cork, urethane, EVA, thermoplastic elastomer, and rubber that can improve the touch and the gripping performance when the grip members 50 and 60 are gripped, and appearance, and that can reduce weight, or by applying these materials.

While the embodiment of the present disclosure has been described above, the present disclosure is not limited to the above-described embodiment and can be variously modified.

In the present disclosure, as for the opening hole 2A formed in the reel seat main body 1A, the position of the bottom 2a is not limited as long as the rod 100 to be inserted into and fixed to the opening hole 2A is on the lower side of the reel leg placing portion 7 (placing surface 7a), and the position of the rear end edge 100a of the rod 100 is located further on the rear side than the front end edge 201a' of the reel leg 201 to be attached. Therefore, the opening hole 2A may be formed deep to the vicinity of the rear end 201b of the reel leg 201. Also, the inclination angle of the inclined surface 20 formed on the seat main body 1A is freely selected, and the surface shape thereof can appropriately be changed to a curved shape, a flat surface, a composite surface of these, or the like. In addition, the surface shape of the recessed portion formed on the inclined surface can also be appropriately changed to a partially recessed shape, a recessed shape in a composite surface in which flat and curved hollows are combined, a partially bulged shape, or the like. Further, the configuration of the moving hood 9 (moving method in the axial direction, position fixing structure, and the like) can be variously modified, and the means for moving the moving hood in the axial direction is not limited to the method using the rotation operating member (grip member 60) described above.

In addition, the shape of the seat main body 1A is not limited to the shape illustrated in the drawings, and can be variously modified. For example, appropriate modification such as partially forming a bulging portion or a recess (curved portion) from a curved surface, an inclined surface, or the like, or further forming a hollowing portion, a cutout portion, an opening, or the like, can be made for better fitting with the pad of the finger and the palm. Such hollowing, cutout, protrusions and recesses, and the like are preferably formed in a portion that does not affect gripping performance, and the thickness of the seat main body 1A is not limited.

REFERENCE SIGNS LIST

1 Reel seat
1A Seat main body
2, 3 Tubular portion
7 Reel leg placing portion
7a Front placing portion (placing surface)
7b Rear placing portion (placing surface)
8 Fixed hood
9 Moving hood
10 Intermediate connecting portion (bridge portion)
20 Inclined surface
30 Trigger
50, 60 Grip member
100 Rod
100a Rear end edge
200 Fishing reel
201 Reel leg
205 Clutch lever

The invention claimed is:

1. A reel seat comprising:
   a seat main body that comprises a reel leg placing portion to which a reel leg of a fishing reel is placed and fixed and a tubular portion with an opening hole into which a rear end portion of a rod is fitted and fixed, and
   a grip on a rear side of the reel leg placing portion, wherein
   the opening hole is configured so that the rod to be fitted and fixed, or the rod to be fitted and fixed with a joining material interposed therebetween, is offset downward with respect to an axial center of the grip, is further on a lower side than the reel leg placing portion, and is configured so that a rear end edge of the rod or a rear end edge of the joining material is located further on a rear side than a front end edge of the reel leg in a state where the reel leg of the fishing reel is placed and fixed to the reel leg placing portion,
   the seat main body comprises a fixed hood on a rear side of the reel leg placing portion, and an inclined surface that rises from the fixed hood toward a rear side, and
   a moving hood is on the tubular portion and movable in an axial direction.

2. The reel seat according to claim 1, wherein a cross-sectional shape of a surface of the inclined surface in a direction orthogonal to the axial direction has a recessed portion whose central region is a hollowed recessed shape.

3. The reel seat according to claim 1, wherein a trigger protrudes on a side of the seat main body opposite to an upper surface of the grip.

4. The reel seat according to claim 1, wherein the seat main body is integrally formed using a hard resin material, a fiber-reinforced resin material, or a lightweight metal material.

5. A reel seat comprising:
   a seat main body that comprises a reel leg placing portion to which a reel leg of a fishing reel is placed and fixed and a tubular portion with an opening hole into which a rear end portion of a rod is fitted and fixed, and
   a grip on a rear side of the reel leg placing portion, wherein
   the opening hole is configured so that the rod to be fitted and fixed, or the rod to be fitted and fixed with a joining material interposed therebetween, is offset downward with respect to an axial center of the grip, is further on a lower side than the reel leg placing portion, and is configured so that a rear end edge of the rod or a rear end edge of the joining material is located further on a rear side than a front end edge of the reel leg in a state where the reel leg of the fishing reel is placed and fixed to the reel leg placing portion,
   the reel leg placing portion comprises a front placing portion on which a front end side of the reel leg is placed and a rear placing portion on which a rear end side of the reel leg is placed, and
   the seat main body comprises a bridge portion having a cavity portion between the front placing portion and the rear placing portion.

6. The reel seat according to claim 5, wherein, in the seat main body, a rib is on an inner surface of the bridge portion in which the cavity portion is formed.

7. The reel seat according to claim 6, wherein the rib is configured so that at least a part of the reel leg of the fishing reel placed on the front placing portion and the rear placing portion abuts on the rib.

8. The reel seat according to claim 5, wherein an outer surface of the bridge portion at a part where the cavity portion is formed has a curved surface that rises toward a rear end along the axial direction and has a recess and a protrusion along the axial direction.

9. A fishing rod to which the reel seat according to claim 1 is fixed.

\* \* \* \* \*